United States Patent
Kurihara et al.

(10) Patent No.: US 11,171,341 B2
(45) Date of Patent: Nov. 9, 2021

(54) FUEL CELL AND METHOD OF MANUFACTURING FUEL CELL

(71) Applicant: TOYOTA JIDOSHA KABUSHIKI KAISHA, Toyota (JP)

(72) Inventors: Takuya Kurihara, Miyoshi (JP); Nobuaki Nonoyama, Chiryu (JP); Kenji Sato, Kasugai (JP); Sachio Okada, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 16/384,271

(22) Filed: Apr. 15, 2019

(65) Prior Publication Data

US 2019/0326616 A1    Oct. 24, 2019

(30) Foreign Application Priority Data

Apr. 18, 2018 (JP) .............................. JP2018-079571

(51) Int. Cl.
*H01M 8/0273* (2016.01)
*H01M 8/0286* (2016.01)

(52) U.S. Cl.
CPC ....... *H01M 8/0273* (2013.01); *H01M 8/0286* (2013.01)

(58) Field of Classification Search
CPC ............. H01M 8/0273; H01M 8/0286; H01M 8/0276; H01M 8/0284
See application file for complete search history.

(56) References Cited

U.S. PATENT DOCUMENTS

| | | | | |
|---|---|---|---|---|
| 2003/0091885 A1* | 5/2003 | Kobayashi | ............ | H01M 8/242 29/623.2 |
| 2012/0258377 A1* | 10/2012 | Sugita | ............... | H01M 8/04089 429/434 |
| 2015/0188152 A1* | 7/2015 | Mitsuta | ............... | H01M 8/0258 429/481 |
| 2017/0229718 A1* | 8/2017 | Taguchi | .............. | H01M 8/0239 |

FOREIGN PATENT DOCUMENTS

JP    2014-238997    12/2014

* cited by examiner

*Primary Examiner* — Zhongqing Wei
(74) *Attorney, Agent, or Firm* — Finnegan, Henderson, Farabow, Garrett & Dunner, LLP (57) ABSTRACT

Stacked unit cells 100 of a fuel cell each comprise a membrane electrode assembly 10, a pair of gas separators 40 and 50, and a first sealing portion 26 provided between the pair of gas separators. The fuel cell further comprises a second sealing portion provided between adjacent ones of the unit cells, a first manifold in which reaction gas flows, and a second manifold in which a coolant flows. One of the first sealing portion and the second sealing portion is an adhesive sealing portion, and another one of the first sealing portion and the second sealing portion is formed of a gasket. The adhesive sealing portion and the gasket are provided along the outer circumference of the manifold, in the fuel cell as viewed in a stacking direction. The gasket and the adhesive sealing portion are arranged in this order from a side closer to the manifold.

4 Claims, 7 Drawing Sheets

FUEL CELL AND METHOD OF MANUFACTURING FUEL CELL

CROSS REFERENCE TO RELATED APPLICATIONS

This application claims priority to Japanese Patent Application No. 2018-79571, filed Apr. 18, 2018, the entire disclosure of which is incorporated by reference herein for all purpose.

BACKGROUND

Field

The present disclosure relates to a fuel cell and a method of manufacturing a fuel cell.

Related Art

Fuel cells are generally manufactured by stacking a plurality of unit cells each prepared by sandwiching a member, including a membrane electrode assembly, with a pair of gas separators. The membrane electrode assembly has an electrolyte membrane with a surface on which an electrode is formed. A conventional method of manufacturing such a fuel cell that has been proposed includes heating and curing the entire sealing member provided between a pair of gas separators that sandwich a membrane electrode assembly, to ensure sealing performance for the interior of the unit cell (see, for example, Patent Literature 1).

Patent Literature 1: JP 2014-238997A

However, this configuration in which the interior of the unit cell is sealed by heating and curing the sealing member provided between the gas separators as described above requires a long period of time for the curing. Thus, there has been a demand for achieving high efficiency of the manufacturing process, that is, for achieving a higher productivity. The inventors of the present application have investigated a method of adhering a sealing member, provided between gas separators, and the gas separators to each other by hot pressing, for improving productivity of a process of providing the sealing member between the gas separators. As a result, the inventors have found out a problem in a sealing structure for a manifold and a fluid flow path in or between unit cells formed with such a method. Specifically, the sealing member and the gas separators that have been adhered to each other receive peeling force due to pressure of a fluid flowing in the manifold, and this may result in insufficient durability of the sealing.

SUMMARY

An aspect of the present disclosure provides a fuel cell comprising a plurality of unit cells stacked. The unit cells each comprise: a membrane electrode assembly with an electrolyte membrane having both surfaces on which electrodes are formed; a pair of gas separators including a gas separator provided on a first surface side of the membrane electrode assembly and a gas separator provided on a second surface side of the membrane electrode assembly; and a first sealing portion provided outside an outer circumference of the membrane electrode assembly, between the pair of gas separators. The fuel cell further comprises: a second sealing portion provided between adjacent ones of the unit cells; a first manifold in which reaction gas flows, the first manifold being formed through the fuel cell in a stacking direction of the unit cells and communicating with a cell internal gas flow path through which the reaction gas flows between the membrane electrode assembly and the gas separator; and a second manifold in which a coolant flows, the second manifold being formed through the fuel cell in the stacking direction of the unit cells and communicating with an inter-cell coolant flow path in which the coolant flows between adjacent ones of the unit cells. One of the first sealing portion and the second sealing portion includes adhesive sealing portions adhered to the two gas separators in contact with the one of the first sealing portion and the second sealing portion, and another one of the first sealing portion and the second sealing portion includes gaskets, and one of the gaskets and one of the adhesive sealing portions are arranged in this order from a side closer to at least one of the first manifold and the second manifold when the fuel cell is viewed in the stacking direction, the one of the gaskets and the one of the adhesive sealing portions being provided along an outer circumference of the at least one of the first manifold and the second manifold.

DETAILED DESCRIPTION

A. Overall Configuration of Fuel Cell

Figure 1:
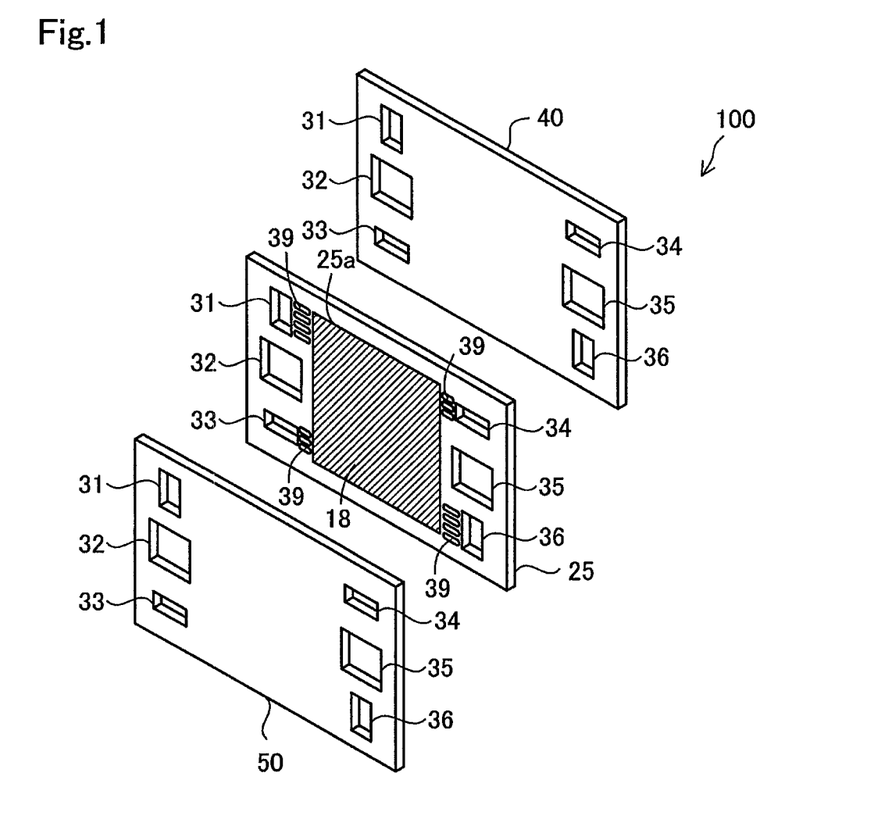
FIG. 1 is an exploded perspective view illustrating a schematic configuration of a unit cell.
Figure 2:
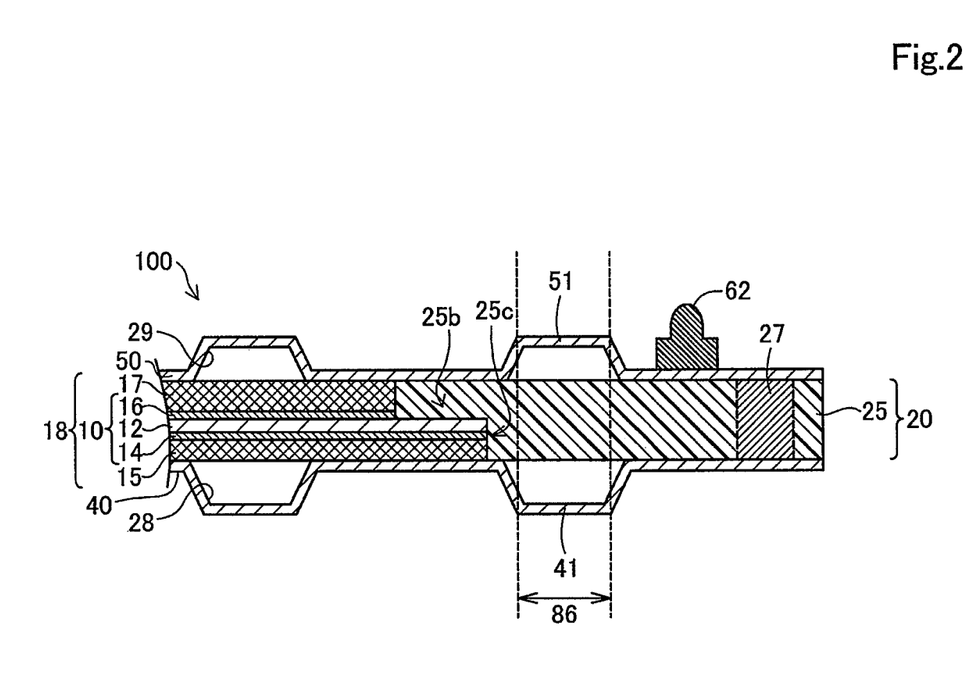
FIG. 2 is a schematic sectional view illustrating a schematic configuration of the unit cell.

FIG. 1 is an exploded perspective view illustrating a schematic configuration of a cell (unit cell) 100 in a fuel cell according to a first embodiment of the present disclosure. FIG. 2 is a schematic sectional view illustrating a schematic configuration of the unit cell 100. A configuration of the fuel cell according to the present embodiment is described below with reference to FIG. 1 and FIG. 2. FIGS. 1 and 2, as well as other figures described later schematically illustrate the configurations of components of the fuel cell according to the present embodiment, and thus the size of each components illustrated in the figure does not represent a specific size.

The fuel cell according to the present embodiment has a stack structure with a plurality of unit cells 100 stacked. The fuel cell according to the present embodiment is a polymer electrolyte fuel cell, but may be other types of fuel cell such as a solid oxide fuel cell.

The unit cell 100 includes a membrane electrode assembly 10 (hereinafter, referred to as an MEA 10), gas diffusion layers 15 and 17, gas separators 40 and 50, and a resin frame 25. As illustrated in FIG. 2, the MEA 10 includes an electrolyte membrane 12, an anode 14 and a cathode 16 that are catalyst electrode layers formed on surfaces of the electrolyte membrane 12. The MEA 10 is sandwiched by the gas diffusion layers 15 and 17. The structure in which the gas diffusion layers 15 and 17 are stacked on the MEA 10 is also referred to as a Membrane Electrode Gas diffusion layer Assembly (MEGA) 18. The resin frame 25 is joined to an outer circumference portion of the MEA 10. The structure in which the resin frame 25 is joined to the MEA 10 is also referred to as a cell frame assembly 20. In the present embodiment, the cell frame assembly 20 includes the gas diffusion layers 15 and 17. The cell frame assembly 20 is sandwiched by the gas separators 40 and 50 from both sides. The gas separator 50 has a surface, opposite to the surface joined to the cell frame assembly 20, provided with a gasket. Note that in addition to this gasket illustrated as a gasket 62 in FIG. 2, a gasket 60 is further provided on the gas separator 50 as described later (see FIG. 4). The gaskets 60 and 62 seal a fluid flow path between adjacent unit cells 100 (hereinafter, also referred to as "between cells"). Arrangement of the gaskets 60 and 62 will be described in detail later.

The electrolyte membrane 12 is a polymer electrolyte material (a proton-conductive ion exchange membrane formed of fluororesin for example) exerting excellent proton conductivity in a wet state. The anode 14 and the cathode 16 are each a porous member with pores, and are formed by coating conductive particles (carbon particles for example) carrying a catalyst such as platinum or platinum alloy for example, with polyelectrolyte having proton conductivity. The polyelectrolyte of the anode 14 and the cathode 16 may include a polymer of a type that is the same as or different from that of the polyelectrolyte of the electrolyte membrane 12.

The gas diffusion layers 15 and 17, which are members having gas permeability and electron conductivity, can be formed from a metallic member such as foaming metal or a metal mesh or a carbon member such as a carbon cloth or carbon paper.

The gas separators 40 and 50 are rectangular plate-like members. The gas separators 40 and 50 are gas impermeable conductive members that are, for example, carbon members such as polymer electrolytic dense carbon with gas impermeability obtained by compressing carbon or metal members such as press-molded stainless steel. Flow path grooves 28 and 29 in which reaction gas supplied for electrochemical reaction flows are formed on surfaces of the gas separators 40 and 50 facing the MEGA 18. The flow path groove 28 forms a cell internal fuel gas flow path in which fuel gas including hydrogen flows between the gas separator 40 and the anode 14. The flow path groove 29 forms a cell internal oxidizing gas flow path in which oxidizing gas including oxygen flows between the gas separator 50 and the cathode 16. In FIG. 1, a recessed and protruding shape including the flow path grooves 28 and 29 formed on the surfaces of the gas separator 40 and the gas separator 50 are omitted. Porous members for forming the cell internal gas flow path may be formed between the gas separators 40 and 50 and the gas diffusion layers 15 and 17. In such a case, the flow path grooves 28 and 29 may be omitted.

The resin frame 25 is formed by using resin such as thermoplastic resin, and is molded to have a rectangular frame-like outer shape. The resin frame 25 has an opening 25a, at the center, serving as a holding area for the MEA 10 (MEGA 18). As illustrated in FIG. 1, the resin frame 25 is provided with a plurality of slits 39 that will be described in detail later.

Examples of the material of the resin frame 25 may include modified polyolefin such as modified polypropylene provided with adhesiveness through introduction of a functional group (e.g., ADMER (registered trademark) manufactured by Mitsui Chemicals, Inc.). The resin frame 25 and the gas separators 40 and 50 are adhered to each other by hot pressing. FIG. 2 illustrates an adhesive sealing portion 27 as an example of a portion where the gas separators 40 and 50 and the resin frame 25 are adhered to each other by hot pressing. When the resin frame 25 is formed by modified polyolefin provided with adhesiveness, the resin frame 25 and the gas separators 40 and 50 can be adhered to each other easily by hot pressing. When the resin frame 25 is formed of resin without any particular adhesiveness, the resin frame 25 may have a surface provided with a layer of an adhesive that exerts adhesiveness through hot pressing. The resin frame 25 used in such a case may be formed of resin selected from polypropylene (PP), phenol resin, epoxy resin, polyethylene terephthalate (PET), and polyethylene naphthalate (PEN). The adhesive layer provided on the surface of the resin frame 25 may include a silane coupling agent for example. In the present embodiment, the adhesion between the resin frame 25 and the gas separators 40 and 50 indicates that hydrogen bond or covalent bond is established as a result of chemical reaction progressed between the surface of the resin frame 25 and the surfaces of the gas separators 40 and 50 through hot pressing. The portions of the resin frame 25 adhered to the gas separators 40 and 50 seal the interior of the unit cell 100. Arrangement of the portions where the resin frame 25 and the gas separators 40 and 50 are adhered to each other are described in detail later. An aspect of the bonding portion between the resin frame 25 and the MEA 10 (MEGA 18) will also be described in detail later.

As described above, the gaskets 60 and 62 are provided on the surface of the gas separator 50, and seal a flow path (inter-cell coolant flow path) formed between the gas separator 50 of one of the adjacent unit cells 100 and the gas separator 40 of the other one of the adjacent unit cells 100, when a plurality of unit cells 100 are stacked. The gaskets 60 and 62 may each be formed of an elastic material such as rubber or thermoplastic elastomer for example. The surface of the gas separator 50 on which the gaskets 60 and 62 are formed is also referred to as a first surface, and the surface of the gas separator 50 that is opposite to the first surface and to be in contact with the resin frame 25 in which the adhesive sealing portion 27 is formed is also referred to as a second surface. The first surface may be regarded as being opposite to the surface of the gas separator 50 on which the MEA 10 is provided.

Each of manifold holes 31 to 36, for forming a manifold, is formed at positions of the gas separators 40 and 50 and the resin frame 25 close the outer circumference and overlapping each other in a stacking direction of members including the MEA 10 and the gas separators 40 and 50 (the stacking direction of the unit cell 100, which is also simply referred to as a stacking direction). Thus, in the fuel cell, the manifold is formed through a portion where the gas separators 40 and 50 and the resin frame 25 are stacked. The manifold is a flow path through which reaction gas or a coolant flows, is formed through the fuel cell in the stacking direction, and communicates with the cell internal gas flow path formed in the unit cell 100 or the inter-cell coolant flow path formed between the adjacent unit cells 100. Specifically, the manifold holes 31 and 36 form an oxidizing gas manifold through which the oxidizing gas is supplied to or discharged from the cell internal oxidizing gas flow path. The manifold holes 33 and 34 form a fuel gas manifold through which fuel gas is supplied to and discharged from the cell internal fuel gas flow path. The manifold holes 32 and 35 form a coolant manifold through which the coolant is supplied to and discharged from the inter-cell coolant flow path. The oxidizing gas manifold and the fuel gas manifold are also referred to as a first manifold, and the coolant manifold is also referred to as a second manifold.

B. Arrangement of Sealing Portion

Figure 3:
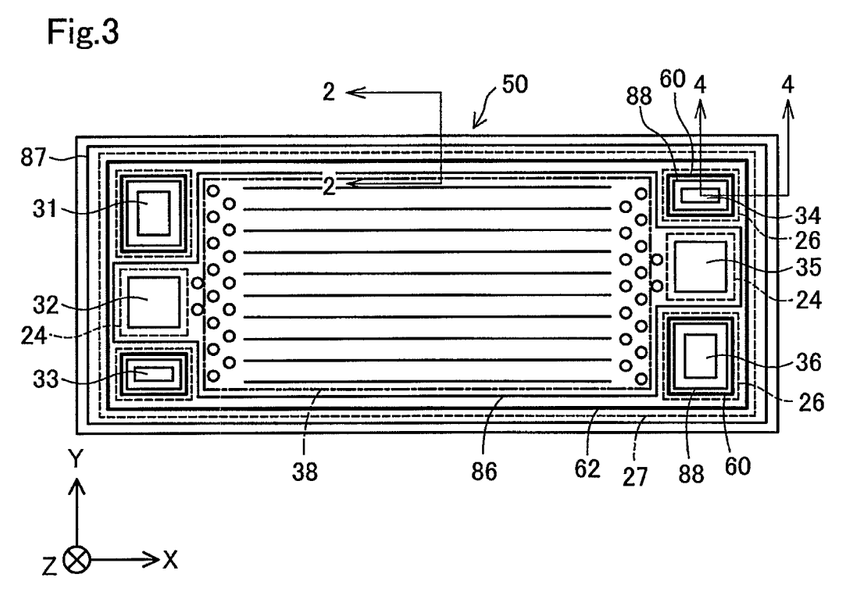
FIG. 3 is a plan view of a gas separator.
Figure 4:
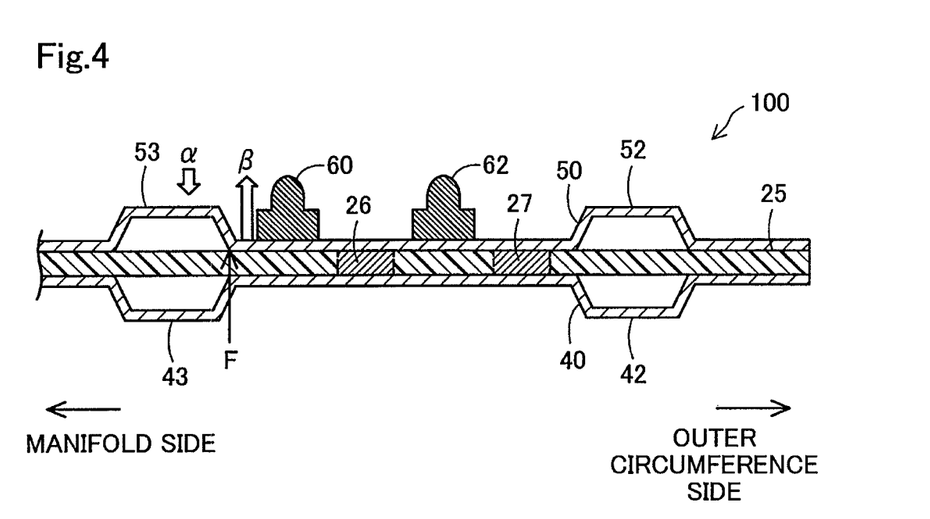
FIG. 4 is a schematic cross sectional view illustrating a schematic configuration of the unit cell.
Figure 5:
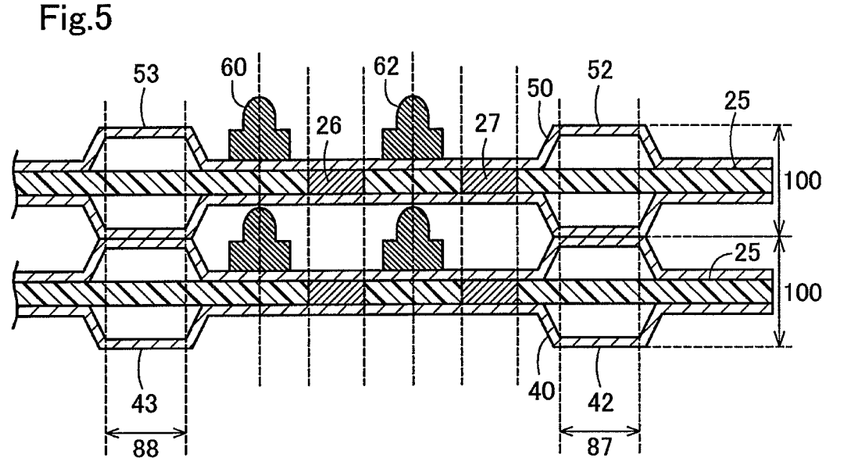
FIG. 5 is a cross-sectional view schematically illustrating a state where the unit cells are stacked.

FIG. 3 is a plan view of the gas separator 50. FIG. 4 is a schematic cross sectional view illustrating a schematic configuration of the unit cell 100. FIG. 5 is a cross-sectional view schematically illustrating a state where the unit cells 100 are stacked. FIG. 2 described above is a sectional view taken along the line 2-2 in FIG. 3, and FIG. 4 is a cross-sectional view taken along the line 4-4 in FIG. 3. FIG. 5, which is a cross-sectional view similar to FIG. 4, illustrates a state where two unit cells 100 are stacked, as an example of how the unit cells 100 are stacked.

In FIG. 3, a Z direction represents the stacking direction, and X and Y directions represent two directions that are orthogonal to the stacking direction, parallel to the plane of the gas separator 50, and orthogonal to each other. As described above, the six manifold holes 31 to 36 are formed in the gas separator 50. The manifold holes 31 to 33 are formed along one of two sides, in the four sides defining the outer circumference of the gas separator 50, extending in the Y direction, and the manifold holes 34 to 36 are formed along the other one of the two side extending in the Y direction.

As illustrated in FIG. 4, the unit cell 100 includes the gaskets 60 and 62. The gaskets 60, as well as the gaskets 62, are provided at corresponding positions on the unit cells 100. Thus, the gaskets 60, as well as the gaskets 62, of the unit cells 100 overlap with each other in the stacking direction when the unit cells 100 are stacked as illustrated in FIG. 5. In FIG. 5, dashed lines extending in the stacking direction indicate the overlapping of the gaskets 60 and 62 in the stacking direction. The gaskets 60 and 62 seal the inter-cell fluid flow path by reaction force produced in the gaskets 60 and 62 as a result of lips (distal end portions of the gaskets 60 and 62) coming into contact with the gas separator 40 of the adjacent unit cells 100 and thus applying pressing force in the stacking direction. Such a sealing portion formed by the gaskets 60 and 62 in the present embodiment, that is, the sealing portion provided between the unit cells 100 is also referred to as a "second sealing portion".

As illustrated in FIG. 4, the resin frame 25 of the unit cell 100 is provided with adhesive sealing portions 26 and the adhesive sealing portions 27 that are formed by adhering the resin frame 25 and the gas separators 40 and 50 to each other. The adhesive sealing portions 26, as well as the adhesive sealing portions 27, are provided at corresponding positions of the unit cells 100. Thus, the adhesive sealing portions 26, as well as the adhesive sealing portions 27, of the unit cells 100 are arranged to overlap in the stacking direction when the unit cells 100 are stacked as illustrated in FIG. 5. In FIG. 5, dotted lines extending in the stacking direction indicate the overlapping of the adhesive sealing portions 26 and 27 in the stacking direction. Such a sealing portion that is provided in the unit cell 100 and seals the fluid flow path in the unit cell, as exemplified by the adhesive sealing portions 26 and 27 in the present embodiment, is also referred to as a "first sealing portion". The sealing portion including the first sealing portion and the second sealing portion disables a fluid to flow between the sealing portion and the gas separator in contact with the sealing portion, at a portion where the sealing portion is provided.

In FIG. 3, positions where the gaskets 60 and 62 and the adhesive sealing portions 26 and 27 are provided, when the fuel cell is viewed in the stacking direction, are illustrated to overlap with the gas separator 50. The gaskets 60 and 62 are provided on the surface of the gas separator 50 illustrated in FIG. 3. The adhesive sealing portions 26 and 27 are provided on the back surface of the gas separator 50 not illustrated in FIG. 3. Each of the gaskets 60 and 62 as well as the adhesive sealing portions 26 and 27 linearly extends along the gas separator plane of the gas separator 50.

As illustrated in FIG. 3, the manifold holes 31, 33, 34, and 36 are each surrounded by the gasket 60 on the first surface of the gas separator 50. The adhesive sealing portion 26 surrounds the outer side of the gasket 60 on the second surface of the gas separator 50. Thus, in the fuel cell according to the present embodiment, the gasket 60 and the adhesive sealing portion 26, provided along the outer circumference of the manifold holes 31 33, 34, and 36, are arranged in this order from the side closer to the manifold holes 31, 33, 34, and 36, when the fuel cell is viewed in the stacking direction.

The gasket 60 seals the gas manifold, formed by the manifold hole 31, 33, 34, and 36, between cells. The adhesive sealing portion 26 seals the gas manifold, formed by the manifold holes 31, 33, 34, and 36, in the unit cell. As illustrated in FIG. 1, the resin frame 25 according to the present embodiment is provided with slits portions 39 at positions close to the manifold holes 31, 33, 34, and 36 and closer to the MEGA 18 than the manifold holes 31, 33, 34, and 36 are. Each of these slit portions 39 includes a plurality of slits that are elongated through holes extending to a position close to the outer circumference of the MEGA 18 from a position close to the outer circumference of a corresponding one of the manifold holes 31, 33, 34, and 36. Each of the slits forms a communication flow path through which the corresponding one of the manifolds 31, 33, 34, and 36 communicates with the corresponding cell internal gas flow path in the unit cell 100, when the resin frame 25 is sandwiched by the gas separators 40 and 50. Specifically, the manifold holes 33 and 34 communicate with the cell internal fuel gas flow path, and the manifold holes 31 and 36 communicate with the cell internal oxidizing gas flow path.

As illustrated in FIG. 3, the gasket 62 is arranged to entirely surround an area (also referred to as a power generation area 38) provided with the electrodes (the anode 14 and the cathode 16) and areas provided with the manifold holes 31 to 36, when the fuel cell is viewed in the stacking direction. In FIG. 3, the power generation area 38 is illustrated as an area surrounded by a dotted chain line. The power generation area 38 is an area where the cell internal gas flow path is formed when the fuel cell is viewed in the stacking direction. The gasket 62 seals the inter-cell coolant flow path. The gaskets 60 and 62 are also referred to as a gas sealing portion and a coolant sealing portion, respectively.

As illustrated in FIG. 3, the above-described adhesive sealing portion 27 provided to the resin frame 25 is provided closer to the outer circumference of the gas separator 50 than the gasket 62 is, to surround the entire gasket 62, when the fuel cell is viewed in the stacking direction.

The adhesive sealing portion 24 is formed on the resin frame 25 to surround the manifold holes 32 and 35 forming the coolant manifold. The adhesive sealing portion 24 seals the coolant manifold in the unit cell 100.

As illustrated in FIG. 3, in the present embodiment, no further sealing member is provided but a contact portion 88 where protrusions formed in the gas separators 40 and 50 come into contact with each other is provided between the gasket 60 and the manifold holes 31, 33, 34, and 36, when the gas separator 50 is viewed in the stacking direction. As illustrated in FIG. 5, the contact portion 88 is a portion where a protrusion 43 formed in the gas separator 40 and a protrusion 53 formed in the gas separator 50 come into contact with each other. Similarly, as illustrated in FIG. 3, no further sealing member is provided but a contact portion 86 where protrusions formed in the gas separators 40 and 50 come into contact with each other is provided between the gasket 62 and the outer circumferences of the power generation area 38 and the manifold holes 32 and 35. As illustrated in FIG. 2, the contact portion 86 is a portion where a protrusion 41 formed in the gas separator 40 and a protrusion 51 formed in the gas separator 50 come into contact with each other. Furthermore, as illustrated in FIG. 3, a contact portion 87, where protrusions formed in the gas separators 40 and 50 come into contact with each other, is provided along the outer circumference of the gas separator 50, at a position close to the outer circumference of the gas separator 50. As illustrated in FIG. 5, the contact portion 87 is a portion where a protrusion 42 formed in the gas separator 40 and a protrusion 52 formed in the gas separator 50 come into contact with each other. These contact portions 86 to 88 are structures for ensuring a strength of the stack forming the fuel cell.

C. Method of Manufacturing Fuel Cell

Figure 6:
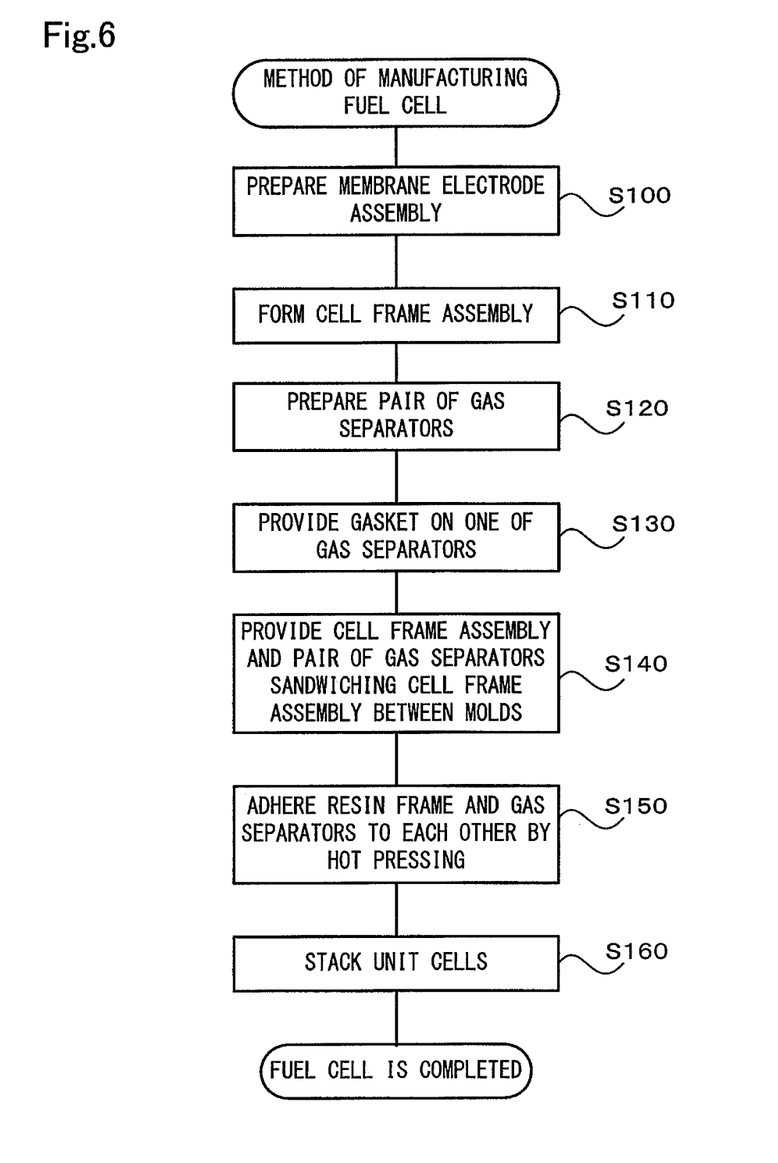
FIG. 6 is a diagram illustrating steps in a method of manufacturing a fuel cell.

FIG. 6 is a diagram illustrating steps in a method of manufacturing a fuel cell according to the present embodiment. Steps for forming a sealing portion are described below with reference to FIG. 6.

To manufacture a fuel cell, first of all, the MEA 10 is prepared (step S100). Then, the cell frame assembly 20 is formed (step S110). The cell frame assembly 20 is formed by joining the resin frame 25 to the outer circumference portion of the MEA 10. In the present embodiment, before the resin frame 25 is joined, the MEA 10 and the gas diffusion layers 15 and 17 are joined to each other by pressing to form the MEGA 18. As illustrated in FIG. 2, the MEGA 18 according to the present embodiment has an exposed area, not covered by the cathode 16 or the gas diffusion layer 17, in the outer circumference portion of the electrolyte membrane 12. A step portion including a step bottom surface 25b and a step side surface 25c is formed on an inner circumference edge for forming the opening 25a at the center of the resin frame 25. The MEGA 18 is fit in this step portion with the exposed area of the outer circumference portion of the electrolyte membrane 12 joined to the step bottom surface 25b. With the exposed area of the outer circumference portion of the electrolyte membrane 12 thus joined to the step bottom surface 25b of the resin frame 25, gas sealing is achieved between the cell internal fuel gas flow path and the cell internal oxidizing gas flow path. For example, the exposed area of the electrolyte membrane 12 may be joined to the step bottom surface 25b of the resin frame 25 as follows. Specifically, an adhesive layer including ultraviolet (UV) curable adhesive may be provided on the resin frame 25 and irradiated with UV. An example of the UV curable adhesive that can be used includes adhesive including polyisobutylene and butyl rubber.

The gas separators 40 and 50 are prepared (step S120). The gaskets 60 and 62 are arranged on one surface (first surface) of the gas separator 50 (step S130). The gaskets 60 and 62 may be adhered onto the gas separator 50 with adhesive for example.

The cell frame assembly 20 and the pair of gas separators 40 and 50 sandwiching the cell frame assembly 20 are provided between molds for hot pressing (step S140). Then, the resin frame 25 and the gas separators 40 and 50 are adhered to each other by hot pressing (step S150), whereby the unit cell 100 is formed. Specifically, in step S140, the pair of gas separators 40 and 50 sandwich the cell frame assembly 20, with the other surface (second surface) of the gas separator 50 without the gaskets 60 and 62 brought into contact with the cell frame assembly 20.

Figure 7:
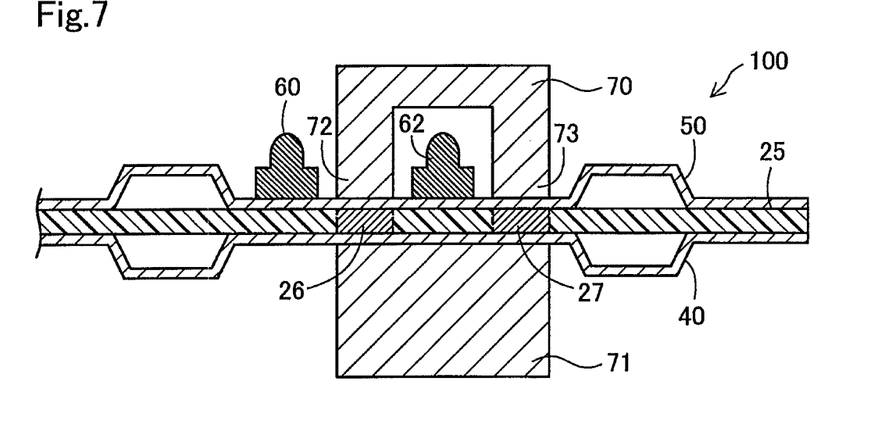
FIG. 7 is a cross-sectional view schematically illustrating step S150.

FIG. 7 is a cross-sectional view schematically illustrating how the hot pressing is performed by using the molds in step S150. The position of the cross-sectional view in FIG. 7 is the same as those in FIG. 4 and FIG. 5. The molds used in the present embodiment include a first mold 70 and a second mold 71. The first mold 70 used in step S150 includes a pair of head portions 72 and 73. The head portion 72 is provided to come into contact with the gas separator 50 at a position where the adhesive sealing portion 26 illustrated in FIG. 3 is formed. The head portion 73 is provided to come into contact with the gas separator 50 at a position where the adhesive sealing portion 27 illustrated in FIG. 3 is formed. Thus, the head portion 72 and the head portion 73 are provided at positions on both sides of the gasket 62, in a direction orthogonal to the stacking direction. Although not elaborated in FIG. 7, the first mold 70 further includes a head portion for forming the adhesive sealing portion 24 described above. These head portions may be separately formed members, or may be a single member integrally formed.

As illustrated in FIG. 7, the second mold 71 according to the present embodiment has a continuous portion in contact with the gas separator 40 to overlap with the head portions 72 and 73 as viewed in the stacking direction. This portion of the second mold 71 to be in contact with the gas separator 40 is formed as a flat surface without unevenness. Note that the second mold 71 may have any other shape as long as the hot pressing can be performed with the head portions of the first mold 70.

In step S150, after the members are arranged between the first mold 70 and the second mold 71, the resin frame 25 and the gas separators 40 and 50 are hot pressed with a load and heat applied between the first mold 70 and the second mold 71. Thus, the adhesive sealing portions 24, 26, and 27 are formed at positions of the resin frame 25 as illustrated in FIG. 3.

After step S150, a plurality of the unit cells 100, each having the adhesive sealing portions 24, 26, and 27 formed, are stacked (step S160), and the resultant stack is entirely fastened in the stacking direction, whereby the fuel cell is completed.

In the fuel cell according to the present embodiment having the configuration described above, the gasket 60 and the adhesive sealing portion 26, provided along the outer circumference of the manifolds 31, 33, 34, and 36, are arranged in this order from the side closer to the manifolds 31, 33, 34, and 36 when the fuel cell is viewed in the stacking direction. With the gasket thus provided closer to the manifold than the adhesive sealing portion, the adhesive sealing portion is less likely to be peeled. The gasket formed of an elastic member achieves sealing by producing reaction force upon receiving pressing force in the stacking direction between the two gas separators 40 and 50. Thus, the gasket is less likely to be peeled than the adhesive sealing portion, when peeling force is applied between the gas separators by a high pressure fluid in the manifold. Thus, the arrangement described above can improve the durability of the sealing in the fuel cell under the peeling force applied between the gas separators 40 and 50 from the side of the manifold due to the gas pressure in the manifold.

In the fuel cell according to the present embodiment described above, the sealing portions sealing the cell internal and inter-cell fluid flow paths each include the adhesive sealing portion 24, 26, and 27 or the gasket 60 and 62. Thus, the sealing portions can be formed by simple methods such as hot pressing and adhering, so that no heating process taking a long period of time is required for curing the entire members forming the sealing portions. Thus, the fuel cell can be manufactured with efficient processes. All things considered, the durability of the sealing in the fuel cell as described above and productivity can both be improved.

In the present embodiment, the gasket 62 and the adhesive sealing portion 27, provided along the outer circumference of the power generation area 38, are arranged in this order from the side closer to the power generation area 38, in the portion of the sectional view taken along the line 2-2 illustrated in FIG. 3, that is, in the outer circumference area along the side extending in the X direction in the rectangular gas separator 50. This area close to the outer circumference of the power generation area 38 is an area that receives the peeling force between the gas separators 40 and 50 from the side of the power generation area 38, due to the gas pressure in the cell internal gas flow path formed in the power generation area 38. In such an area, the gasket 62 and the adhesive sealing portion 27 are arranged in this order from the side closer to the power generation area 38 so that an effect similar to that with the gasket 60 and the adhesive sealing portion 26 provided outside the outer circumference of the manifold described above can be obtained. Specifically, the gasket 62 can prevent the adhesive sealing portion 27 from peeling due to the pressure in the cell internal gas flow path formed in the power generation area 38. Thus, the peeling between the gas separators 40 and 50 is less likely to occur.

The peeling force between the adjacent gas separators 40 and 50 may be produced by a factor other than the pressure of the fluid flowing in the manifold and the pressure of the gas flowing in the gas flow path formed in the power generation area 38, as described below. As described above, the contact portion 88 is provided between the manifold and the gasket 60 when the fuel cell is viewed in the stacking direction (see FIG. 3 and FIG. 5). The contact portion 88 is a portion where the protrusion 43 formed on the gas separator 40 and the protrusion 53 formed on the gas separator 50 come into contact with each other. This contact portion 88 receives pressing force in the stacking direction when the fuel cell is fastened. In FIG. 4, a white arrow indicates force a in the stacking direction applied to the protrusion 53 of the gas separator 50 in the contact portion 88. When this force is applied, force 6 in a direction for peeling the gas separator 50 from the resin frame 25 is produced with a portion F serving as a fulcrum. The portion F is a portion where the protrusion 53 is raised from the area of the gas separator 50 in contact with the resin frame 25. In FIG. 4, the portion F is indicated by an arrow, and a white arrow represents the force B produced in the gas separator 50. In the present embodiment, the contact portion 88 resulting in the force 6 is provided outside the manifold. Still, the gasket 60 and the adhesive sealing portion 26 are arranged in this order to be closer to the outer circumference than the contact portion 88 is. Thus, the gas separator can be prevented from peeling from the resin frame 25.

As illustrated in FIG. 3, in the present embodiment, the gasket 62, which is one of the gaskets 60 and 62 provided inside the cell, serving as the coolant sealing portion is formed to surround the outer side of the gasket 60 serving as the gas sealing portion, when the fuel cell is viewed in the stacking direction. With the coolant sealing portion thus provided to surround the gas sealing portion, even when leakage from the gas sealing portion occurs, the coolant flow path in which the coolant flows and the coolant sealing portion can prevent the gas from leaking out from the fuel cell. In particular, this configuration can be employed for the gas sealing portion sealing fuel gas including hydrogen, so that safety can be improved with hydrogen prevented from leaking out. The coolant sealing portion may be formed to have a continuous linear shape surrounding the gas sealing portion, which is the shape of the gasket 62 according to the present embodiment, in terms of gas leakage prevention. Note that the configuration of surrounding the outer side of the gas sealing portion with the coolant sealing portion does not necessarily need to be employed if the gas sealing portion can seal the gas with enough reliability.

D. Alternative Embodiments (D-1) Alternative Embodiment 1

An alternative configuration may be employed for the configuration of the embodiment described above where the entire circumference of each of the manifold holes 31, 33, 34, and 36 is surrounded by the gasket 60 and the adhesive sealing portion 26. For example, the gasket 60 may have a discontinuous portion instead of surrounding the entire circumference of the manifold holes 31, 33, 34, and 36. Also with this configuration, the gas separators 40 and 50 can be prevented from peeling from the manifold side and the above described effects can be obtained, with the gasket 60 and the adhesive sealing portion 26 arranged in this order from the side closer to the manifold hole. Note that the configuration of surrounding the entire circumference of the manifold holes 31, 33, 34, and 36 with the gasket 60 can reduce pressure applied to the adhesive sealing portion 26 and the peeling force on the adhesive sealing portion 26. Each of the adhesive sealing portions 26 may not have an independent annular shape, and may have any shape as long as the sealing of the interior of the cell is ensured in the fuel cell as a whole.

(D-2) Alternative Embodiment 2

An alternative configuration may be employed for the configuration of the embodiment described above where the gasket 62 and the adhesive sealing portion 27, provided along the outer circumference of the power generation area 38, are arranged in this order from the side closer to the power generation area 38 when the fuel cell is viewed in the stacking direction. The gas separators 40 and 50 can be prevented from peeling from the manifold hole outer circumference as long as the configuration of arranging the gasket and the adhesive sealing portion in this order from the side closer to the manifold is employed, when the fuel cell is viewed in the stacking direction, for the manifold.

(D-3) Alternative Embodiment 3

An alternative configuration may be employed for the configuration of the embodiment described above for the gas manifold. Specifically, the gasket and the adhesive sealing portion are arranged in this order from the side closer to the manifold when the fuel cell is viewed in the stacking direction. For example, this configuration may be employed for the coolant manifold instead of the gas manifold, or may be employed for both of the coolant manifold and the gas manifold. In such a case, the gasket surrounding the coolant manifold may be discontinuously formed or the other like configuration may be employed for making the coolant manifold and the inter-cell coolant flow path communicate with each other for example.

(D-4) Alternative Embodiment 4

In the embodiment described above, the adhesive portions 24, 26, and 27 are formed by hot pressing the resin frame 25 joined to the outer circumference portion of the MEA 10 (MEGA 18). Alternatively, the adhesive sealing portion 26 may be formed using a sealing member having a shape different from that of the resin frame 25. For example, at least a part of the adhesive sealing portions 24, 26, and 27 may be formed by a sealing member different from the sealing members for forming the other adhesive sealing portion.

(D-5) Alternative Embodiment 5

An alternative configuration may be employed for the configuration of the embodiment described above where the adhesive sealing portion is arranged inside the unit cell 100, and the gasket is provided between unit cells 100. Specifically, the gasket may be used for sealing the interior of the unit cell 100, and the adhesive sealing portion may be used for the sealing between the unit cells 100. Also with this configuration, an effect similar to that in the embodiment described above can be obtained by arranging the gasket and the adhesive sealing portion, provided along the outer circumference of the manifold, in this order from the side closer to the manifold, when the fuel cell is viewed in the stacking direction.

The present disclosure is not limited to the embodiments described above, and can be implemented with various configurations without departing from the scope of the present disclosure. For example, the technical features that are described in the embodiments and correspond to those of the aspects descried in the SUMMARY section can be replaced and combined as appropriate to partially or entirely solve the problem described above, or partially or entirely achieve the effects described above. The technical features that are not described as an essential feature in the specification can be omitted as appropriate. For example, the present disclosure may be implemented as the following aspects.

(1) An aspect of the present disclosure provides a fuel cell comprising a plurality of unit cells stacked. The unit cells each comprise: a membrane electrode assembly with an electrolyte membrane having both surfaces on which electrodes are formed; a pair of gas separators including a gas separator provided on a first surface side of the membrane electrode assembly and a gas separator provided on a second surface side of the membrane electrode assembly; and a first sealing portion provided outside an outer circumference of the membrane electrode assembly, between the pair of gas separators. The fuel cell further comprises: a second sealing portion provided between adjacent ones of the unit cells; a first manifold in which reaction gas flows, the first manifold being formed through the fuel cell in a stacking direction of the unit cells and communicating with a cell internal gas flow path through which the reaction gas flows between the membrane electrode assembly and the gas separator; and a second manifold in which a coolant flows, the second manifold being formed through the fuel cell in the stacking direction of the unit cells and communicating with an inter-cell coolant flow path in which the coolant flows between adjacent ones of the unit cells. One of the first sealing portion and the second sealing portion includes adhesive sealing portions adhered to the two gas separators in contact with the one of the first sealing portion and the second sealing portion, and another one of the first sealing portion and the second sealing portion includes gaskets, and one of the gaskets and one of the adhesive sealing portions are arranged in this order from a side closer to at least one of the first manifold and the second manifold when the fuel cell is viewed in the stacking direction, the one of the gaskets and the one of the adhesive sealing portions being provided along an outer circumference of the at least one of the first manifold and the second manifold.

With the fuel cell according to this aspect, with the gasket provided closer to the manifold than the adhesive sealing portion, the adhesive sealing portion can be prevented from peeling and the durability of the sealing in the fuel cell can be improved. Furthermore, with the sealing portion provided, a simple method of adhering can be employed, whereby the fuel cell can be manufactured with efficient processes, and the productivity can be improved.

(2) In the fuel cell according to the aspect, the second sealing portion may include a coolant sealing portion configured to seal the inter-cell coolant flow path and a gas sealing portion configured to seal the first manifold, and the coolant sealing portion may be formed to surround an outer side of the gas sealing portion when the fuel cell is viewed in the stacking direction. With the fuel cell according to this aspect, even when leakage from the gas sealing portion occurs, the coolant flow path in which the coolant flows and the coolant sealing portion can prevent the reaction gas from leaking out from the fuel cell.

(3) In the fuel cell according to the aspect, the unit cells may each further comprise a resin frame joined to an outer circumference of the membrane electrode assembly between the pair of gas separators, the first manifold and the second manifold may be formed through portions where the resin frame and the gas separator are stacked, the first sealing portion may be the adhesive sealing portion, and the adhesive sealing portion may be a part of the resin frame. With the fuel cell according to this aspect, the first sealing portion serving as the adhesive sealing portion can be formed by using the resin frame joined to the outer circumference portion of the membrane electrode assembly.

(4) In the fuel cell according to the aspect, another one of the gaskets and another one of the adhesive sealing portions may be arranged in this order from the side closer to the electrode when the fuel cell is viewed in the stacking direction, the other one of the gaskets and the other one of the sealing portions being provided at positions along the outer circumference of the electrode. With the fuel cell according to this aspect, the gasket can prevent the adhesive sealing portion from peeling due to the pressure in a flow path formed in an area overlapping with the electrode in the stacking direction.

The present disclosure may be implemented with various aspects other than those described above, and may be implemented in aspects such as a method of manufacturing a fuel cell, a unit cell for a fuel cell, a method of manufacturing a unit cell, and a method of arranging a sealing portion in a fuel cell.

What is claimed is:

1. A fuel cell comprising a plurality of unit cells stacked, the unit cells each comprising:
   a membrane electrode assembly with an electrolyte membrane having both surfaces on which electrodes are formed;

a pair of gas separators including a gas separator provided on a first surface side of the membrane electrode assembly and a gas separator provided on a second surface side of the membrane electrode assembly;

a first sealing portion provided outside an outer circumference of the membrane electrode assembly, between the pair of gas separators; and a resin frame joined to the outer circumference of the membrane electrode assembly between the pair of gas separators, wherein the fuel cell further comprises:

a second sealing portion provided between adjacent unit cells;

a first manifold in which reaction gas flows, the first manifold being formed through the fuel cell in a stacking direction of the unit cells and communicating with a cell internal gas flow path through which the reaction gas flows between the membrane electrode assembly and one of the pair of gas separators; and a second manifold in which a coolant flows, the second manifold being formed through the fuel cell in the stacking direction of the unit cells and communicating with an inter-cell coolant flow path in which the coolant flows between adjacent unit cells, wherein the first sealing portion includes adhesive sealing portions adhered to the two gas separators in contact with the first sealing portion, and the second sealing portion includes gaskets, one of the gaskets and one of the adhesive sealing portions are arranged in this order from a side closer to at least one of the first manifold and the second manifold when the fuel cell is viewed in the stacking direction, the one of the gaskets and the one of the adhesive sealing portions being provided along an outer circumference of the at least one of the first manifold and the second manifold, the first manifold and the second manifold are formed through portions where the resin frame and the pair of gas separators are stacked, the adhesive sealing portions are parts of the resin frame, the second sealing portion includes a coolant sealing portion configured to seal the inter-cell coolant flow path and a gas sealing portion configured to seal the first manifold, and the coolant sealing portion is formed separately from the gas sealing portion to surround an outer circumference of the gas sealing portion when the fuel cell is viewed in the stacking direction, such that the coolant sealing portion and the inter-cell coolant flow path prevent the reaction gas from leaking from the gas sealing portion to outside of the fuel cell.

2. The fuel cell according to claim 1, wherein another one of the gaskets and another one of the adhesive sealing portions are arranged in this order from the side closer to the electrode when the fuel cell is viewed in the stacking direction, the other one of the gaskets and the other one of the adhesive sealing portions being provided at positions along the outer circumference of the electrode.

3. A method of manufacturing a fuel cell including a plurality of unit cells stacked, the method comprising:

preparing a membrane electrode assembly with an electrolyte membrane having both surfaces on which electrodes are formed;

joining a resin frame to an outer circumference of the membrane electrode assembly;

preparing a pair of gas separators in which manifold holes are formed, the manifold holes being configured to form manifolds in which any one of reaction gas and a coolant flows, the manifolds each being formed through the fuel cell in a stacking direction of the unit cells and communicating with one of:

a cell internal gas flow path through which the reaction gas flows on the membrane electrode assembly, and an inter-cell coolant flow path in which the coolant flows between adjacent unit cells;

arranging one of the pair of gas separators on one surface side of the membrane electrode assembly and arranging another one of the pair of gas separators on another surface side of the membrane electrode assembly;

providing a first sealing portion outside the outer circumference of the membrane electrode assembly, between the pair of gas separators; and providing a second sealing portion on a surface of the one of the pair of gas separators opposite to a side on which the membrane electrode assembly is provided, wherein the manifolds are formed through portions where the resin frame and the pair of gas separators are stacked, and the providing the first sealing portion and the providing the second sealing portion include:

adhering a sealing member configured to form the first sealing portion, and the two gas separators being in contact with the sealing member, to each other by hot pressing to form adhesive sealing portions as the first sealing portion, and arranging the second sealing portion as gaskets; and arranging one of the gaskets and one of the adhesive sealing portions in this order from a side closer to at least one of the manifolds, when the fuel cell is viewed in the stacking direction, the one of the gaskets and the one of the adhesive sealing portions being provided along an outer circumference of the at least one of the manifolds, wherein the adhesive sealing portions are parts of the resin frame, the second sealing portion includes a coolant sealing portion configured to seal the inter-cell coolant flow path and a gas sealing portion configured to seal one of the manifolds in which the reaction gas flows, and the coolant sealing portion is formed separately from the gas sealing portion to surround an outer circumference of the gas sealing portion when the fuel cell is viewed in the stacking direction, such that the coolant sealing portion and the inter-cell coolant flow path prevent the reaction gas from leaking from the gas sealing portion to outside of the fuel cell.

4. The method of manufacturing a fuel cell according to claim 3, wherein the joining the resin frame to the outer circumference of the membrane electrode assembly includes forming a cell frame assembly, and the providing the first sealing portion includes sandwiching the cell frame assembly with the pair of gas separators, and then hot pressing the resin frame and the pair of gas separators to form the one of the adhesive sealing portions.

* * * * *